United States Patent
Chen

(10) Patent No.: US 8,390,607 B2
(45) Date of Patent: Mar. 5, 2013

(54) LIQUID CRYSTAL DISPLAY PANEL, LIQUID CRYSTAL DISPLAY DEVICE, PHOTO DETECTING DEVICE AND LIGHT INTENSITY ADJUSTMENT METHOD

(75) Inventor: Chih-Chiang Chen, Taipei (TW)

(73) Assignee: Acer Incorporated, New Taipei (TW)

( * ) Notice: Subject to any disclaimer, the term of this patent is extended or adjusted under 35 U.S.C. 154(b) by 513 days.

(21) Appl. No.: 12/576,608

(22) Filed: Oct. 9, 2009

(65) Prior Publication Data
US 2010/0253614 A1    Oct. 7, 2010

(30) Foreign Application Priority Data
Apr. 1, 2009   (TW) ................. 98110924 A

(51) Int. Cl.
*G09G 5/00*   (2006.01)
(52) U.S. Cl. ........................ 345/207; 345/102
(58) Field of Classification Search .......... 345/102, 345/207
See application file for complete search history.

(56) References Cited

U.S. PATENT DOCUMENTS

| | | | |
|---|---|---|---|
| 2005/0052435 A1* | 3/2005 | Cho et al. ................ | 345/182 |
| 2006/0262055 A1 | 11/2006 | Takahara | |
| 2007/0171157 A1* | 7/2007 | Choi et al. ............... | 345/81 |
| 2007/0268206 A1* | 11/2007 | Kinoshita et al. ........ | 345/30 |
| 2007/0279369 A1* | 12/2007 | Yao et al. ................ | 345/102 |
| 2008/0129914 A1* | 6/2008 | de Boer et al. .......... | 349/48 |

FOREIGN PATENT DOCUMENTS

| | | |
|---|---|---|
| CN | 101059938 | 10/2007 |
| CN | 101414068 | 4/2009 |
| JP | 2002-023658 | 1/2002 |
| JP | 2006-253236 | 9/2006 |
| JP | 2006330578 | 12/2006 |
| KR | 10-2005-0036246 | 4/2005 |
| KR | 10-2007-0121915 | 12/2007 |

OTHER PUBLICATIONS

"Office Action of Korean Counterpart Application" with English translation thereof, issued on Feb. 17, 2011, p. 1-9.
"First Office Action of China Counterpart Application", issued on Jun. 10, 2011, p. 1-7.
"Office Action of Japan Counterpart Application", issued on Nov. 29, 2011, p. 1-3.
"Office Action of Taiwan Counterpart Application", issued on Nov. 19, 2012, p1-p10, in which the listed references were cited.

* cited by examiner

*Primary Examiner* — Chanh Nguyen
*Assistant Examiner* — Jonathan Blancha
(74) *Attorney, Agent, or Firm* — Jianq Chyun IP Office

(57) ABSTRACT

The present invention discloses a liquid crystal display panel, liquid crystal display device, photo detecting device and light intensity adjustment method. The liquid crystal display panel comprises a plurality of first scan lines, a plurality of first data lines, a plurality of first thin film transistors, a plurality of liquid crystal pixel units and a built-in photo detecting module. The plurality of first thin film transistors are respectively disposed at intercrosses of the plurality of first scan lines and the plurality of first data lines, and each of the first thin film transistors is connected to the first data line and the first scan line. Each of the first thin film transistors is used to drive a liquid crystal pixel unit. The built-in photo detecting module detects light and outputs a multi-bit digital signal corresponding to the intensity of the light.

17 Claims, 17 Drawing Sheets

LIQUID CRYSTAL DISPLAY PANEL, LIQUID CRYSTAL DISPLAY DEVICE, PHOTO DETECTING DEVICE AND LIGHT INTENSITY ADJUSTMENT METHOD

BACKGROUND OF THE INVENTION

1. Field of the Invention

The present invention relates to a liquid crystal display panel, liquid crystal display device, photo detecting device and light intensity adjustment method; in particular, the present invention relates to a liquid crystal display panel, liquid crystal display device, photo detecting device and light intensity adjustment method applicable for detecting a light source and outputting a multi-bit digital signal corresponding to the intensity of the light.

2. Description of Related Art

Ambient Light Sensing (ALS) may be applied to improve the efficiency of energy management in display devices and enhance viewing quality of applications like televisions, screens, Digital Photo-Frames (DPF), notebook computers, mobile phones, personal navigation device and media players, thereby effectively enabling reduction of power consumption and extension of life span in batteries thereof. For example, the longer time the backlight in a liquid crystal display illuminates, and the more power it consumes. Therefore, through automatic detection on ambient light as well as adjustment to the backlight brightness based on the variation in ambient light, it is possible to achieve intelligent control and lessen power consumption.

The aspect of management for automatic ambient light sensing lies in that it allows spontaneous adjustment for overly bright or overly dark screens according to settable light source feature data, further lowering current dissipation and prolonging battery usable duration, especially regarding to enhancement of efficiency for power utilization on handheld electronic devices as well as provision of clear screen viewing for users. In the prior art, in order to enable a display device with such an ambient light sensing function, it is required to compose an additional sensor module onto the display device. Such an approach may cause undesirable increases in the number of parts and fabrication cost, and miniature or slimness of display devices may not be successfully achieved.

The conventional ambient light sensor generates a photo current under photo excitement by means of photodiode, then the generated photo current is amplified in gains to an operable range through an amplifier; after computation performed by the analog-to-digital converter (ADC), the control signal is sent to the backlight controller for dimming.

However, the conventional ambient light sensor inevitably generates a dark current which adversely affects a signal/noise (S/N) ratio, and such an impact becomes significant upon low lux levels; meanwhile, the dark current fluctuates dramatically when temperature varies, so poor the S/N ratio may occur when used under higher temperature. As a result, in order to effectively read the signal generated by such type of highly sensitive light sensor, it needs to use more sophisticated amplification and ADC conversion circuit design, e.g. additionally disposed a compensation circuit or dark current elimination circuit, thus also undesirably increasing fabrication cost.

SUMMARY OF THE INVENTION

In view of the aforementioned drawbacks in the prior art, the objective of the present invention is to provide a liquid crystal display panel, liquid crystal display device, photo detecting device and light intensity adjustment method, so as to resolve the issue of poor the S/N ratio found in the prior art due to the dark current and variation of temperature.

According to the objective of the present invention, the present invention provides a liquid crystal display panel comprising a plurality of first scan lines, a plurality of first data lines, a plurality of first thin film transistors, a plurality of liquid crystal pixel units and a built-in photo detecting module. The plurality of first thin film transistors are respectively disposed at intercrosses of the plurality of first scan lines and the plurality of first data lines, and each first thin film transistor being connected to the first data line and the first scan line. A liquid crystal pixel unit is driven respectively by each of the thin film transistors. The built-in photo detecting module detects light and outputs a multi-bit digital signal corresponding to the intensity of the light.

Preferably, the built-in photo detecting module comprises at least one second scan line, at least one second data line and a plurality of photo detecting units. Each photo detecting unit comprises a second thin film transistor, at least one storage capacitor and at least one light sensitive element. The second thin film transistor, the storage capacitor and the light sensitive element are electrically connected. Each second thin film transistor is connected to the second scan line and the second data line.

Preferably, the built-in photo detecting module comprises a second scan line, a plurality of third scan lines, a second data line, a third data line and a plurality of photo detecting units. Each photo detecting unit comprises a second thin film transistor, a third thin film transistor, at least one storage capacitor and at least one light sensitive element. The second thin film transistor, the third thin film transistor, the storage capacitor and the light sensitive element are electrically connected. Each second thin film transistor is connected to the second scan line and the second data line. Each third thin film transistor is respectively connected to the third scan line and the third data line.

Preferably, the storage capacitors in the plurality of photo detecting units are provided with different capacitance values.

Preferably, the numbers of the storage capacitors in the plurality of photo detecting units are not the same.

Preferably, the light sensitive elements in the plurality of photo detecting units are provided with different photo sensing areas.

Preferably, the numbers of the light sensitive elements in the plurality of photo detecting units are not the same.

Preferably, the liquid crystal display panel further comprises a color filter, and the color filter is disposed upon the plurality of the first thin film transistors and the plurality of photo detecting units. The color filter comprises multiple transparent apertures with different sizes, and the locations of such multiple transparent apertures respectively correspond to the plurality of photo detecting units.

According to another objective of the present invention, the present invention provides a liquid crystal display device comprising a liquid crystal display panel, a first gate driving circuit, data driving circuit, photo detection driving circuit and computation circuit. The first gate driving circuit is used to output a first control signal to a plurality of first scan lines. The data driving circuit is used to output the display data to a plurality of data lines. The photo detection driving circuit is coupled to a built-in photo detecting module, so as to output at least one second control signal to the built-in photo detecting module and read a multi-bit digital signal from the built-in photo detecting module. The computation circuit is coupled to the photo detection driving circuit, which is used to receive the multi-bit digital signal and compute the intensity of the light based on the multi-bit digital signal.

Preferably, the second control signal comprises a data write enable pulse and a data read enable pulse.

Preferably, when there are multiple second control signals, the plurality of data read enable pulses are asynchronous.

Preferably, the liquid crystal display device further comprises a backlight module, in which the computation circuit is coupled to the backlight module and controls the backlight module based on the computed intensity of light.

According to another objective of the present invention, the present invention provides a photo detecting device capable of detecting light and outputting a multi-bit digital signal corresponding to the intensity of light. The photo detecting device comprises a plurality of photo detecting units and a photo detection driving circuit. Each photo detecting unit comprises a transistor, at least one storage capacitor and at least one light sensitive element, and the transistor, storage capacitor and light sensitive element are electrically connected. The photo detection driving circuit outputs at least one control signal and a reference signal to a plurality of transistors, the control signal comprises a data write enable pulse and a data read enable pulse. When the plurality of transistors receive the data write enable pulse, the at least one storage capacitor of each photo detecting unit is charged based on the reference signal. When the plurality of transistors receive the data read enable pulse, the photo detection driving circuit reads the voltage value in the at least one storage capacitor of each photo detecting unit, and generates a multi-bit digital signal based on the multiple voltage values.

Additionally, the present invention further provides a light intensity adjustment method for a liquid crystal display device, comprising the following steps. Initially, a liquid crystal display panel is provided, and then a first gate driving circuit is used to output a first control signal to a plurality of first scan lines. A data driving circuit is used to output the display data to a plurality of first data lines. Then a built-in photo detecting module is coupled to a photo detection driving circuit. The photo detection driving circuit outputs at least one second control signal to the built-in photo detecting module. A multi-bit digital signal is read by the built-in photo detecting module. A computation circuit is coupled to the photo detection driving circuit to receive the multi-bit digital signal and compute the intensity of light based on the multi-bit digital signal.

Preferably, the backlight module is coupled to the computation circuit and is controlled based on the obtained intensity of light.

Furthermore, the present invention yet further provides a light intensity adjustment method for a photo detecting device, in which the photo detecting device capable of detecting light and outputting a multi-bit digital signal corresponding to the intensity of light. The light intensity adjustment method comprises the following steps. First, a plurality of photo detecting units is provided, and each photo detecting unit includes a transistor, at least one storage capacitor and at least one light sensitive element. Such transistor, storage capacitor and light sensitive element being electrically connected. Then, the photo detection driving circuit is used to output at least one control signal and reference a signal to a plurality of transistors, and the control signal includes a data write enable pulse and a data read enable pulse. When the plurality of transistors receive the data write enable pulse, the at least one storage capacitor of each photo detecting unit is charged based on the reference signal; in which when the plurality of transistors receive the data read enable pulse, the photo detection driving circuit reads the voltage value of the at least one storage capacitor in each photo detecting unit, and generates a multi-bit digital signal based on the multiple voltage values.

In summary, the liquid crystal display panel, liquid crystal display device, photo detecting device and light intensity adjustment method according to the present invention provides one or more following advantages:

(1) Such a liquid crystal display panel, liquid crystal display device, photo detecting device and light intensity adjustment method may be used to detect light and output a multi-bit digital signal corresponding to the intensity of light.

(2) In such a liquid crystal display panel, liquid crystal display device, photo detecting device and light intensity adjustment method, the photo detecting unit is directly embedded and integrated into a liquid crystal or an Organic Light-Emitting Diode (OLED) panel, and the intensity of external light may be obtained according to the leakage current in different photo detecting units and storage capacitors.

(3) In such a liquid crystal display panel, liquid crystal display device, photo detecting device and light intensity adjustment method, extra addition of a photo sensing printed circuit board and modification in mechanism design are not required, thereby it leads to lessen numbers of assemblies in the integrated photo sensor display device, enable reduction in design complexity, cost and facilitate product development.

(4) Such a liquid crystal display panel, liquid crystal display device, photo detecting device and light intensity adjustment method have the advantages of convenient customization, slimness, narrow bezel and green energy for environmental friendliness.

The disclosed photo detecting device architecture is by no means limited to the liquid crystal display panel, liquid crystal display device; all display panels and display devices comprising active matrix, such as display panel and display device consisting of Active Matrix Organic Light Emitting Diode (AMOLED) and Active Matrix Electronic Paper Display (AMEPD), are applicable for the disclosed photo detecting device architecture.

DETAILED DESCRIPTION OF THE PREFERRED EMBODIMENTS

Figure 1:
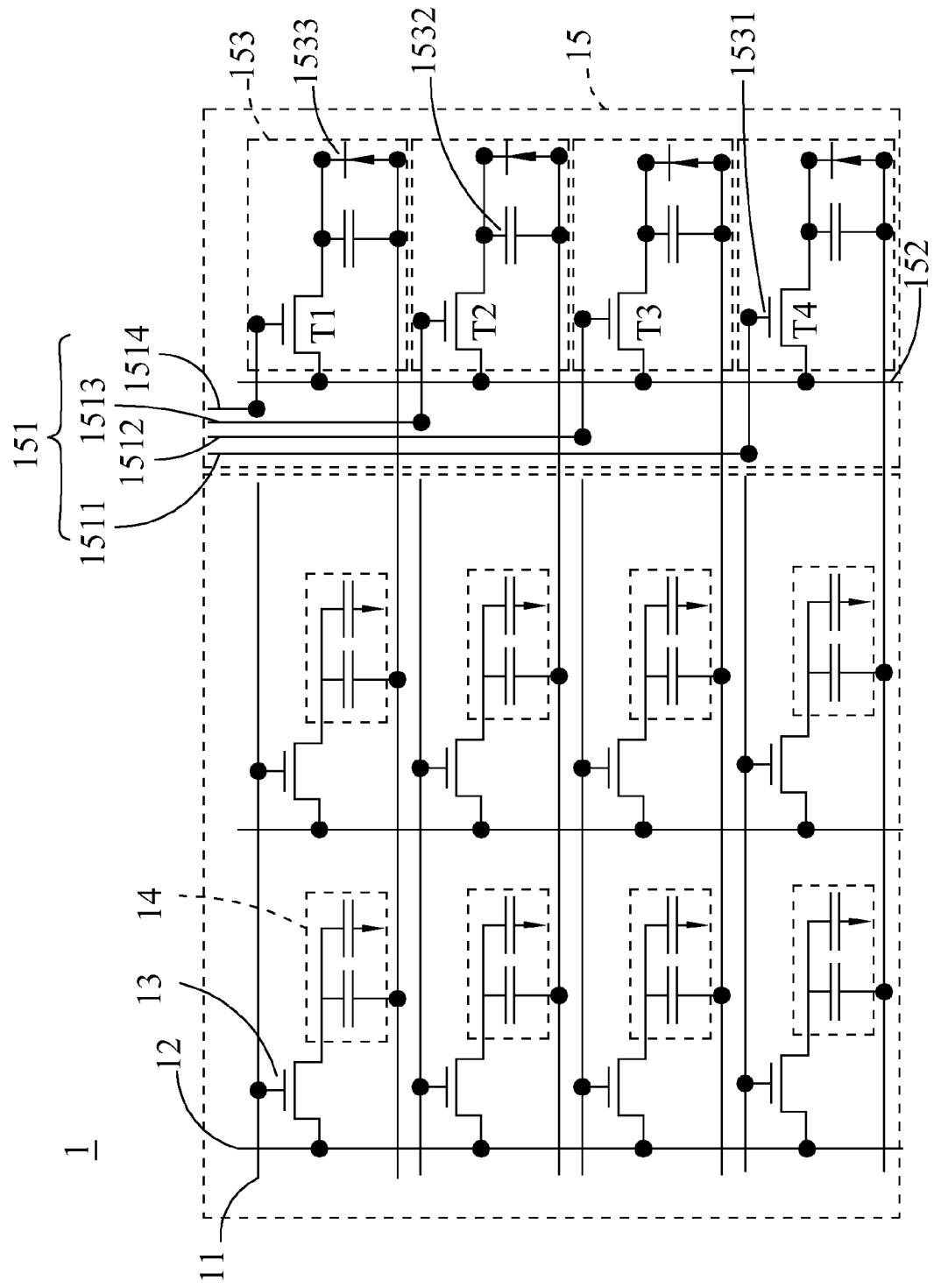
FIG. 1 is a diagram for a first embodiment of the liquid crystal display panel according to the present invention.

FIG. 1 illustrates a diagram for a first embodiment of the liquid crystal display panel according to the present invention. The liquid crystal display panel 1 comprises a plurality of first scan lines 11, a plurality of first data lines 12, a plurality of first thin film transistors 13, a plurality of liquid crystal pixel units 14 and a built-in photo detecting module 15. The plurality of first thin film transistors 13 are respectively disposed at intercrosses of the plurality of first scan lines 11 and the plurality of first data lines 12. Each first thin film transistor 13 is connected to the first data line 11 and the first scan line 12. Each first thin film transistor 13 is used to drive a liquid crystal pixel unit 14. The built-in photo detecting module 15 detects light and outputs a multi-bit digital signal corresponding to the intensity of the light.

The built-in photo detecting module 15 comprises at least one second scan line 151, at least one second data line 152 and a plurality of photo detecting units 153. Herein each photo detecting unit 153 includes a second thin film transistor 1531, at least one storage capacitor 1532 and at least one light sensitive element 1533, and the second thin film transistor 1531, storage capacitor 1532 and light sensitive element 1533 are electrically connected. Each second thin film transistor 1531 is connected to the second scan line 151 and the second data line 152. When there are multiple second scan lines 151, the plurality of second thin film transistors 1531 are respectively connected to a second scan line 151 and a second data line 152. Besides, the second data line 152 may be multiple as well; in such a case, the plurality of second thin film transistors 1531 are respectively connected to the second scan line 151 and each second data line 152.

Figure 2:
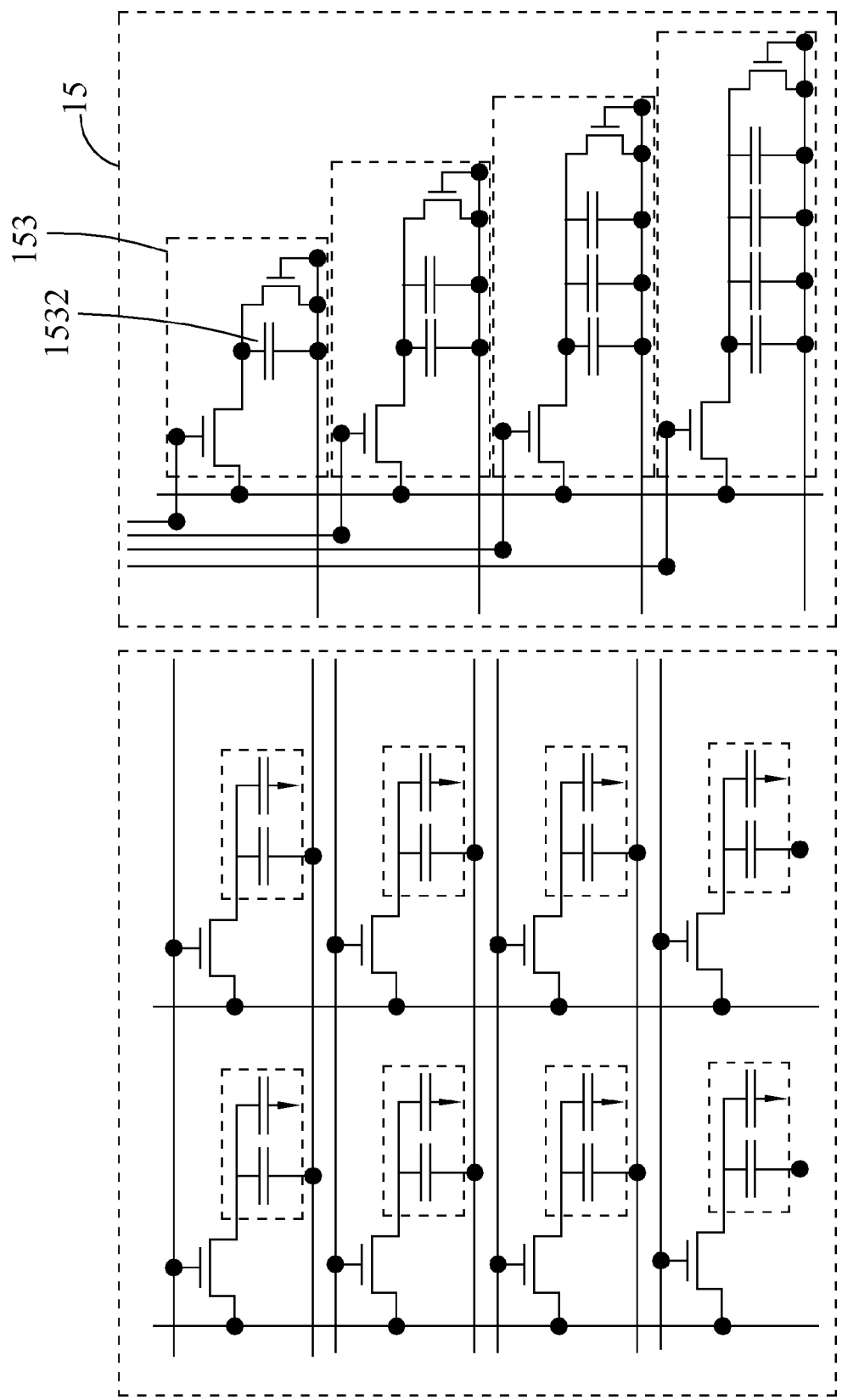
FIG. 2 is a diagram for a second embodiment of the liquid crystal display panel according to the present invention.

FIG. 2 illustrates a diagram for a second embodiment of the liquid crystal display panel according to the present invention. Numbers of the storage capacitors 1532 in the plurality of photo detecting units 153 may be different, and the same effect may be also achieved by configuring the storage capacitors 1532 in the plurality of photo detecting units 153 with different capacitance values.

Figure 3:
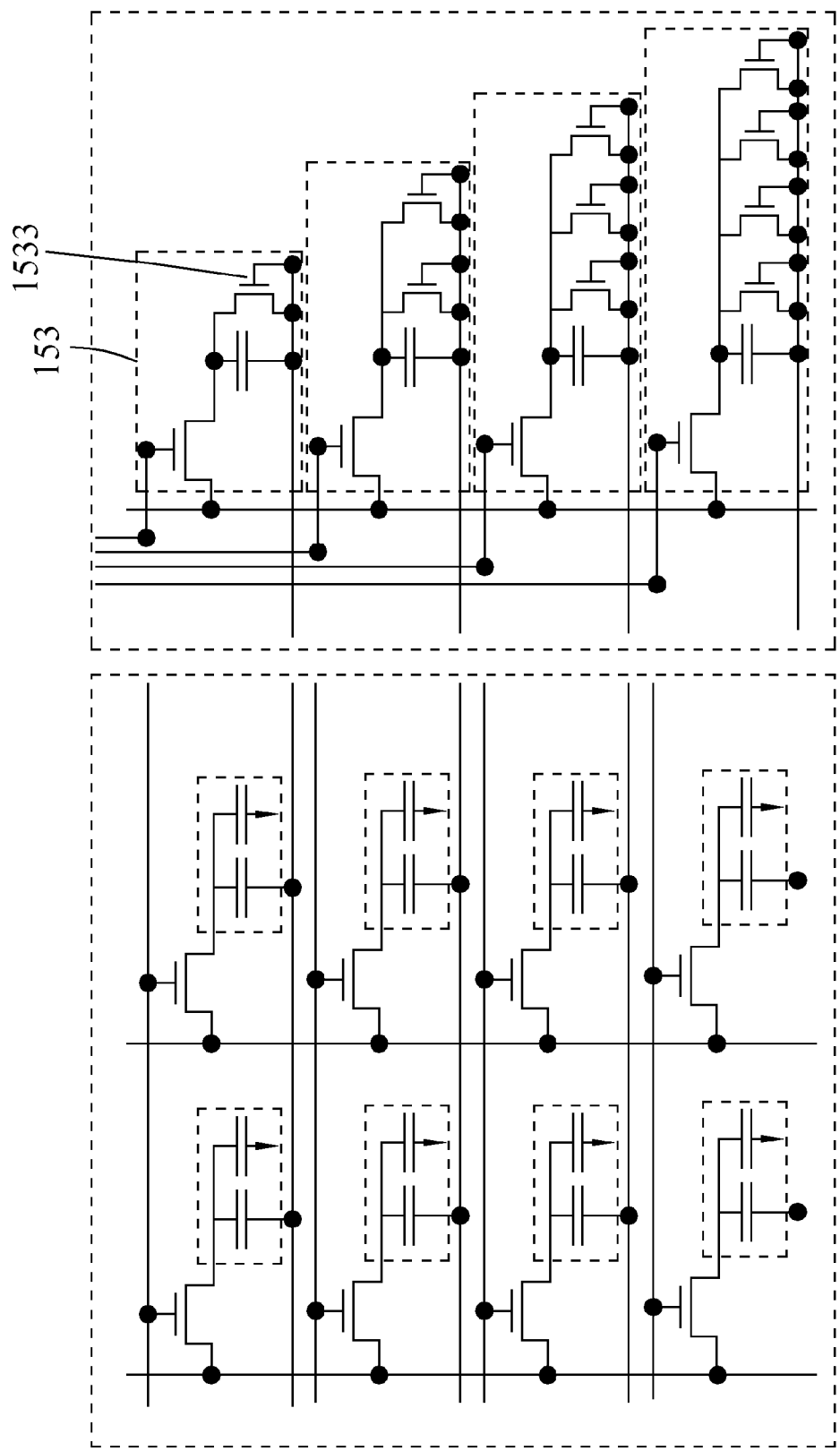
FIG. 3 is a diagram for a third embodiment of the liquid crystal display panel according to the present invention.

FIG. 3 illustrates a diagram for a third embodiment of the liquid crystal display panel according to the present invention. Numbers of the light sensitive element 1533 in the plurality of photo detecting units 153 may be different, and the same effect may be also achieved by configuring the light sensitive element 1533 in the plurality of photo detecting units 153 with different photo sensing areas. Preferably, light sensitive element 1533 may be a photo transistor or a photo diode.

Figure 4:
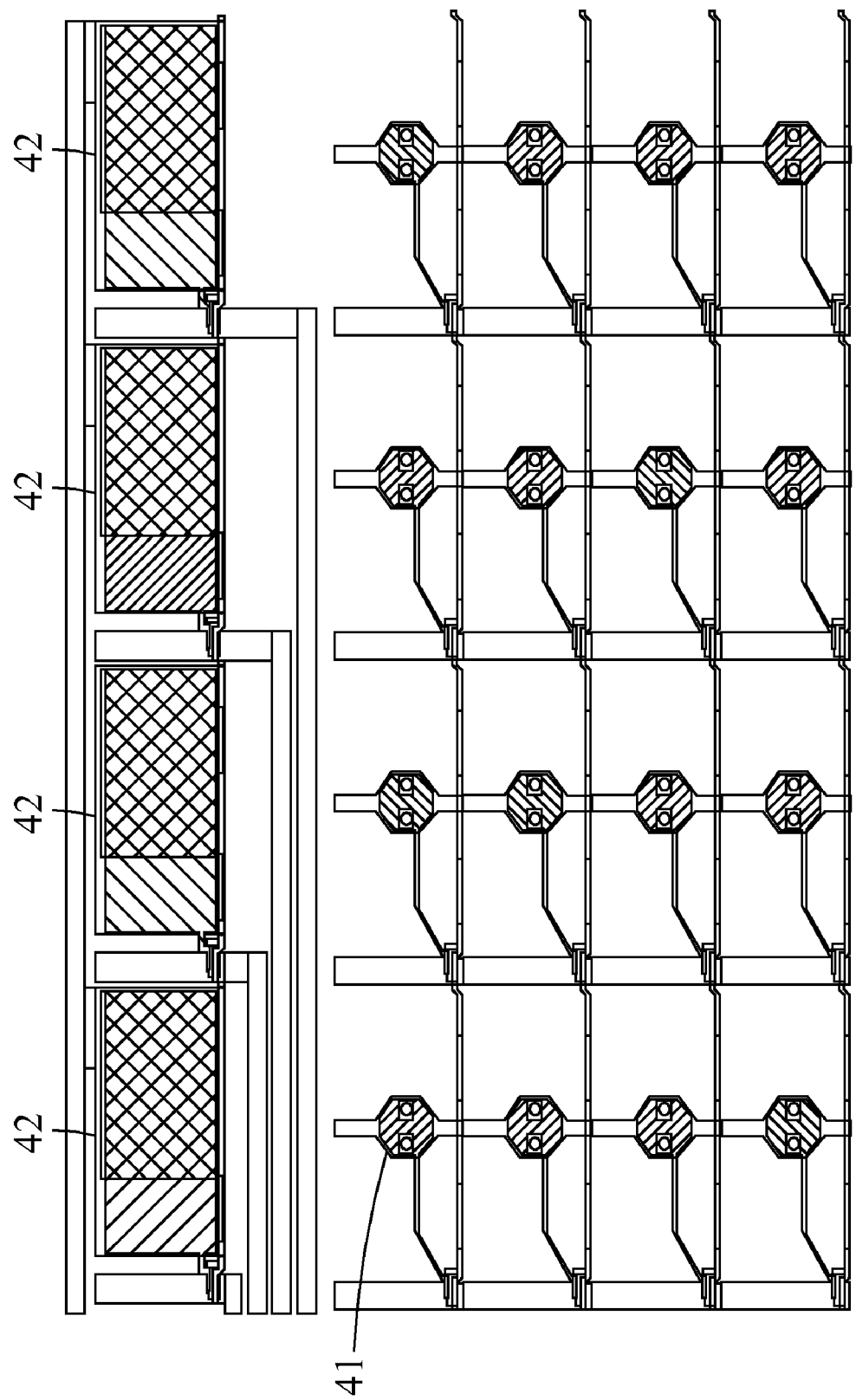
FIG. 4 is a diagram for the circuit layer of the liquid crystal display panel according to the present invention.
Figure 5:
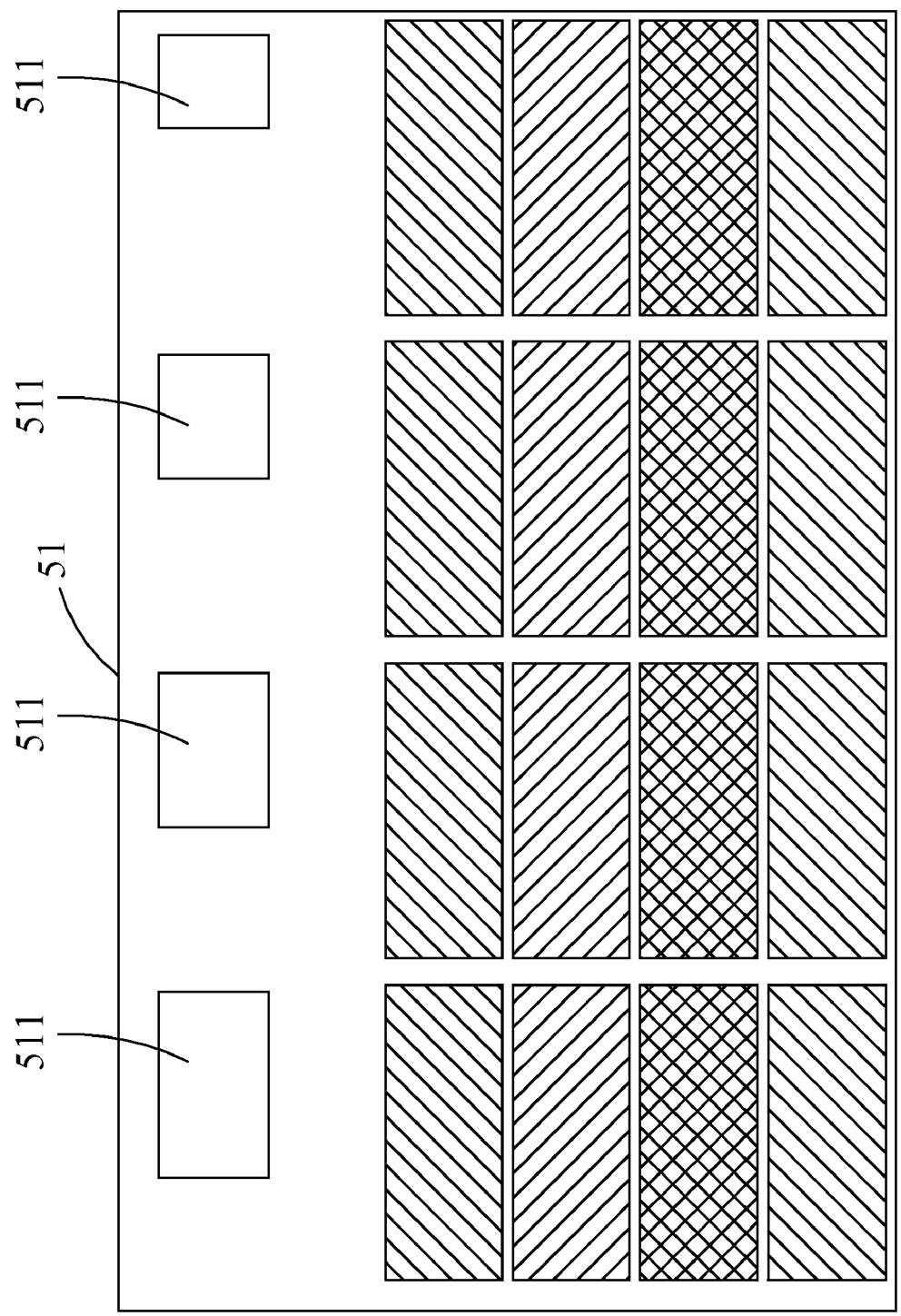
FIG. 5 is a diagram for the color filter of the liquid crystal display panel according to the present invention.
Figure 6:
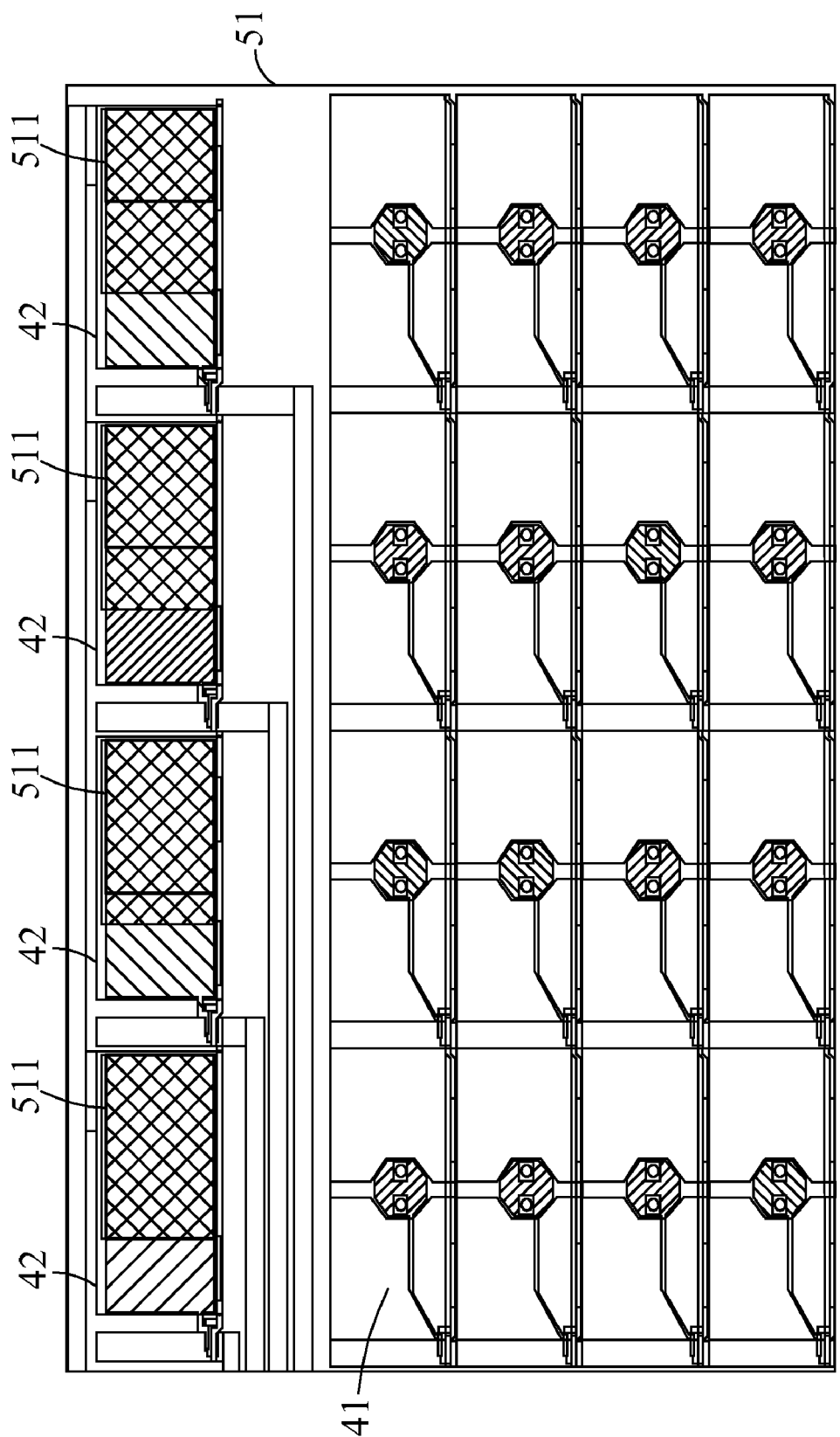
FIG. 6 is a diagram for a fourth embodiment of the liquid crystal display panel according to the present invention.

FIG. 4 illustrates a diagram for the circuit layer of the liquid crystal display panel according to the present invention. A plurality of thin film transistors 41 and a plurality of photo detecting units 42 are illustrated. FIG. 5, illustrates a diagram for the color filter of the liquid crystal display panel according to the present invention. In this Figure, the color filter 51 comprises a plurality of transparent apertures 511 with different sizes. Different photo detecting units 42 may have different exposure areas by using the transparent apertures 511 with different sizes. FIG. 6 illustrates a diagram for a fourth embodiment of the liquid crystal display panel according to the present invention. The liquid crystal display panel 6 further comprises a color filter 51, and the color filter 51 is disposed onto the plurality of first thin film transistors 41 and the plurality of photo detecting units 42, and the locations of the plurality of transparent apertures 511 are respectively corresponding to the plurality of photo detecting units 43.

Figure 7:
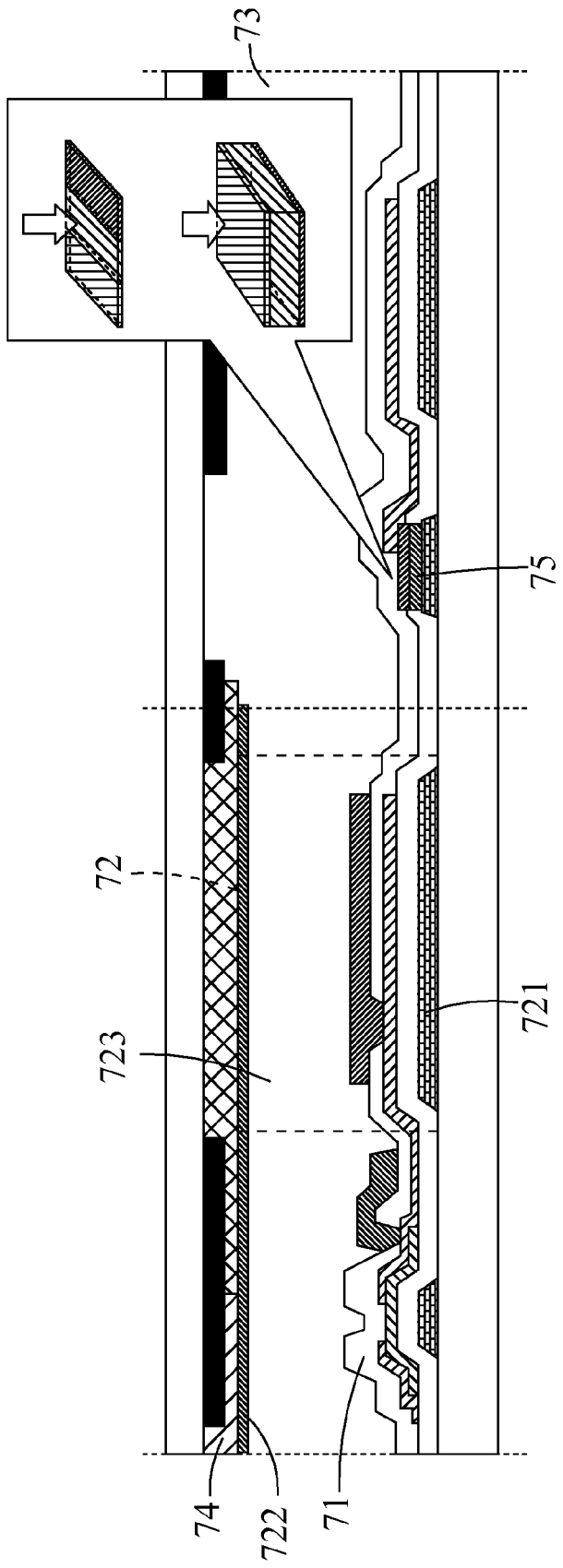
FIG. 7 is a diagram for a fifth embodiment of the liquid crystal display panel according to the present invention.

FIG. 7 illustrates a diagram for a fifth embodiment of the liquid crystal display panel according to the present invention. As illustrated in this Figure, the present embodiment comprises a first thin film transistor 71, a liquid crystal pixel unit 72, a built-in photo detecting module 73 and a color filter 74. The liquid crystal pixel unit 72 comprises a pixel electrode 721, a common electrode 722 and liquid crystal molecules sandwiched between the pixel electrode 721 and the common electrode 722. Herein, the light sensitive element 75 of the built-in photo detecting module 73 is preferably the photo diode.

Figure 8:
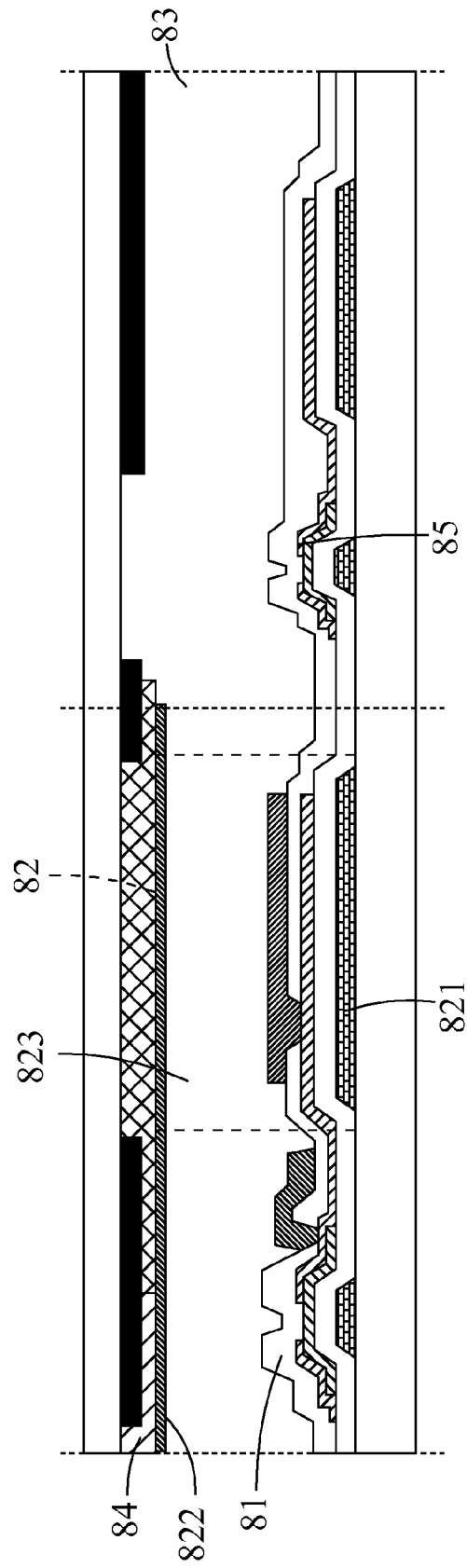
FIG. 8 is a diagram for a sixth embodiment of the liquid crystal display panel according to the present invention.

FIG. 8 illustrates a diagram for a sixth embodiment of the liquid crystal display panel according to the present invention. As illustrated in the Figure, the present embodiment comprises a first thin film transistor 81, a liquid crystal pixel unit 82, a built-in photo detecting module 83 and a color filter 84, in which the liquid crystal pixel unit 82 comprises a pixel electrode 821, a common electrode 822 and liquid crystal molecules sandwiched between the pixel electrode 821 and the common electrode 822. Herein, the light sensitive element 85 of the built-in photo detecting module 83 is preferably the photo transistor.

Figure 9:
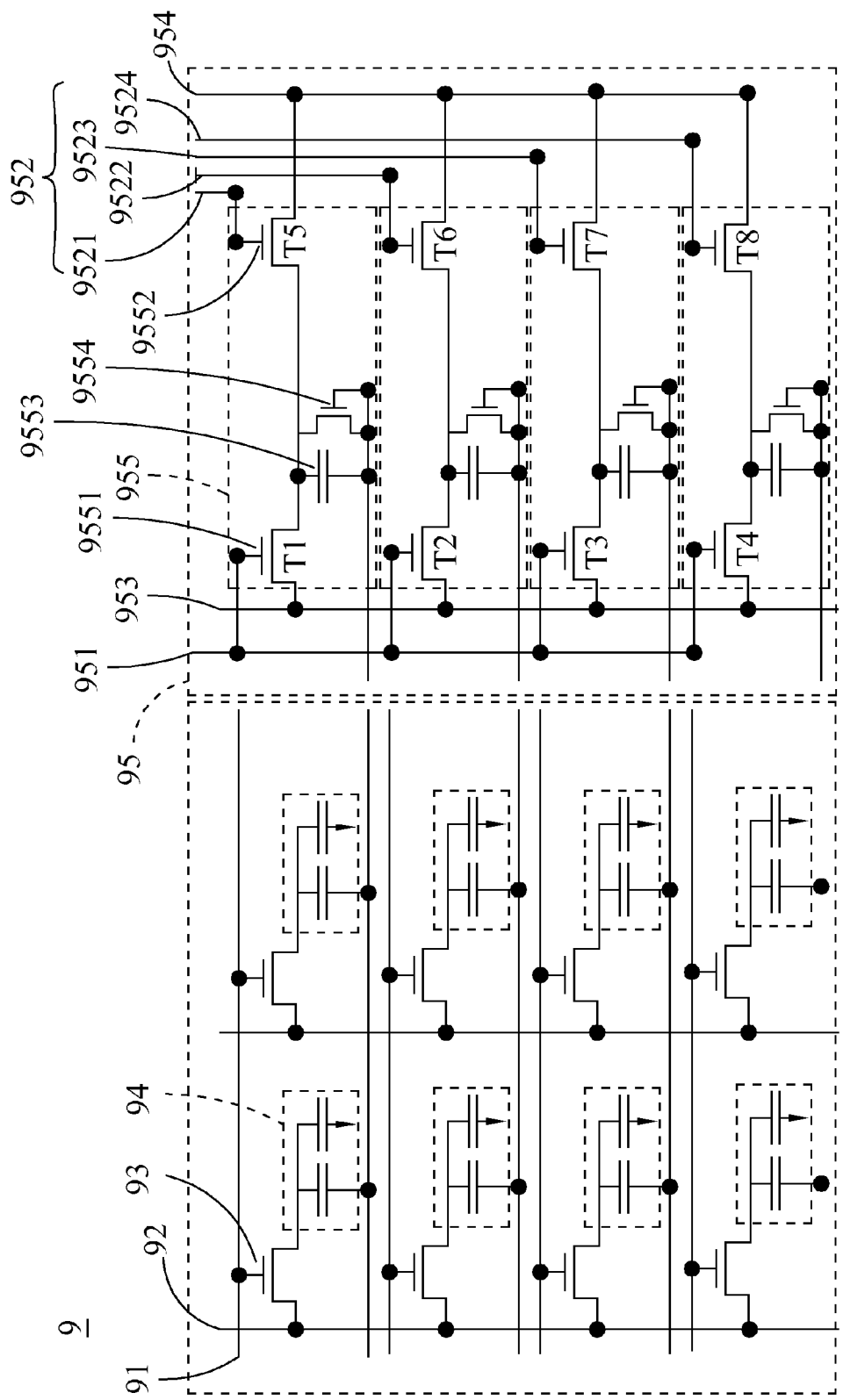
FIG. 9 is a diagram for a seven embodiment of the liquid crystal display panel according to the present invention.

FIG. 9 illustrates a diagram for a seventh embodiment of the liquid crystal display panel according to the present invention. As illustrated in the Figure, the liquid crystal display panel 9 comprises a plurality of first scan lines 91, a plurality of first data lines 92, a plurality of first thin film transistors 93, a plurality of liquid crystal pixel units 94 and a built-in photo detecting module 95. The plurality of first thin film transistors 93 are respectively disposed at the intercrosses of the plurality of first scan lines 91 and the plurality of first data lines 92. Each first thin film transistor 93 are connected to the first data line 91 and the first scan line 92. Each first thin film transistor 93 is used to drive a liquid crystal pixel unit 94. The built-in photo detecting module 95 detects light and outputs a multi-bit digital signal corresponding to the intensity of the light.

The built-in photo detecting module 95 comprises a second scan line 951, a plurality of third scan lines 952, a second data line 953, a third data line 954 and a plurality of photo detecting units 955. Each photo detecting unit 955 includes a second thin film transistor 9551, a third thin film transistor 9552, at least one storage capacitor 9553 and at least one light sensitive element 9554. The second thin film transistor 9551, the third thin film transistor 9552, the storage capacitor 9553 and the light sensitive element 9554 are electrically connected. Each second thin film transistor 9551 is respectively connected to the second scan line 951 and the second data line 953. Each third thin film transistor 9552 is respectively connected to each third scan line 952 and the third data line 954.

Numbers of the storage capacitors 9553 in the plurality of photo detecting units 955 may be different, and the same effect may be also achieved by configuring the storage capacitors 9553 in the plurality of photo detecting units 955 with different capacitance values. Numbers of the light sensitive element 9554 in the plurality of photo detecting units 955 may be different, and the same effect may be also achieved by configuring the light sensitive element 9554 in the plurality of photo detecting units 955 with different photo sensing area. Preferably, the light sensitive element 9554 may be the photo transistor or the photo diode. The liquid crystal display panel 9 further comprises a color filter, and the color filter has multiple transparent apertures with different sizes, and the locations of such multiple transparent apertures are respectively correspond to the plurality of photo detecting units 955.

Figure 10:
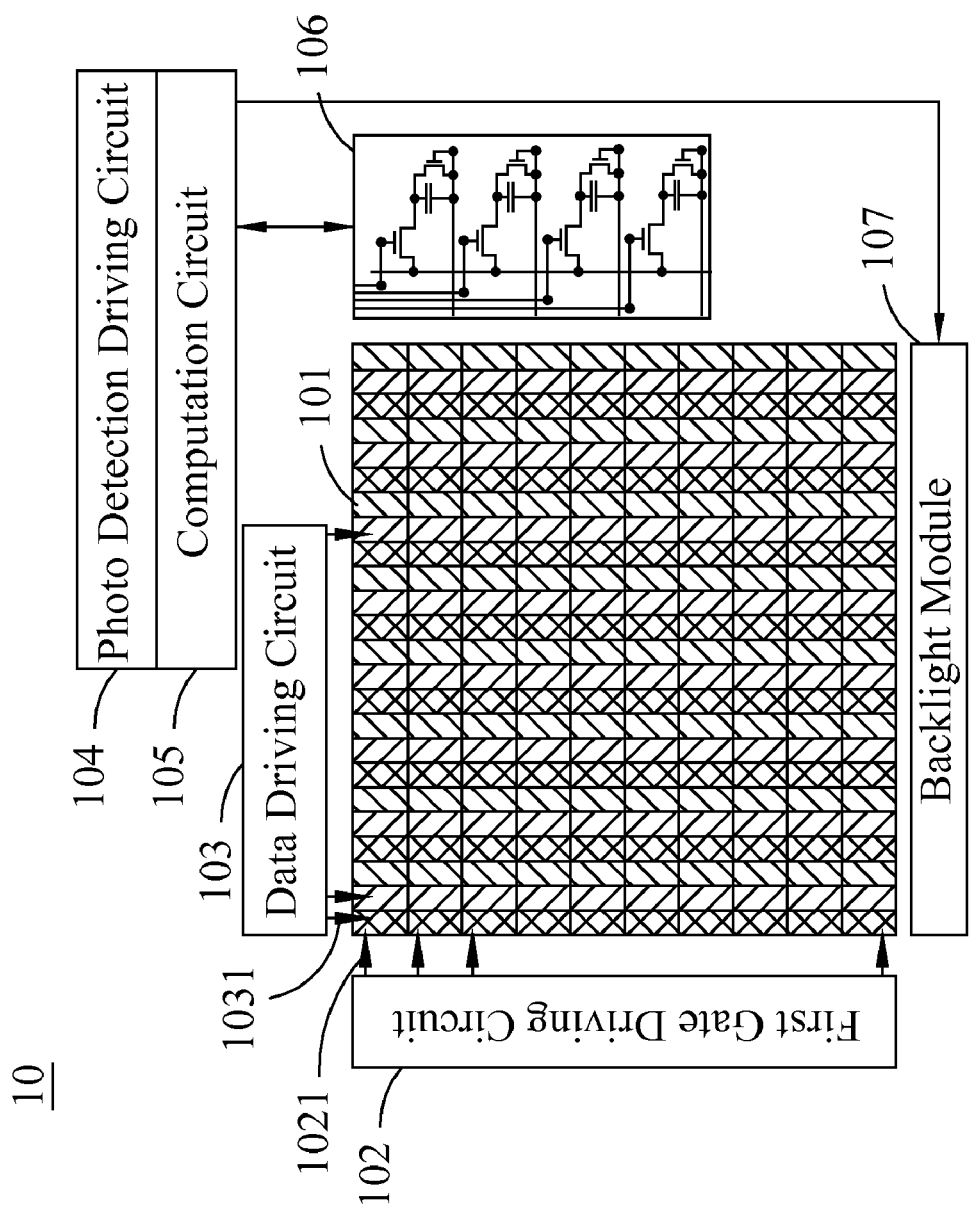
FIG. 10 is a diagram for the first embodiment of the liquid crystal display panel according to the present invention.

FIG. 10 illustrates a diagram for the first embodiment of the liquid crystal display panel according to the present invention. The liquid crystal display device 10 comprises a liquid crystal display panel 101, a first gate driving circuit 102, a data driving circuit 103, a photo detection driving circuit 104 and a computation circuit 105. The first gate driving circuit 102 is used to output a first control signal to a plurality of first scan lines 1021. The data driving circuit 103 is used to output the display data to a plurality of first data lines 1031. The photo detection driving circuit 104 is coupled to a built-in photo detecting module 106, which is used to output at least one second control signal to the built-in photo detecting module 106 and read a multi-bit digital signal from the built-in photo detecting module 106. The computation circuit 105 is coupled to the photo detection driving circuit 104, and is used to receive and compute the multi-bit digital signal to obtain the intensity of light. When the liquid crystal display device 10 further comprises a backlight module 107, the computation circuit 105 is coupled to the backlight module 107 and controls the backlight module 107 based on the obtained intensity of the light.

Figure 11:
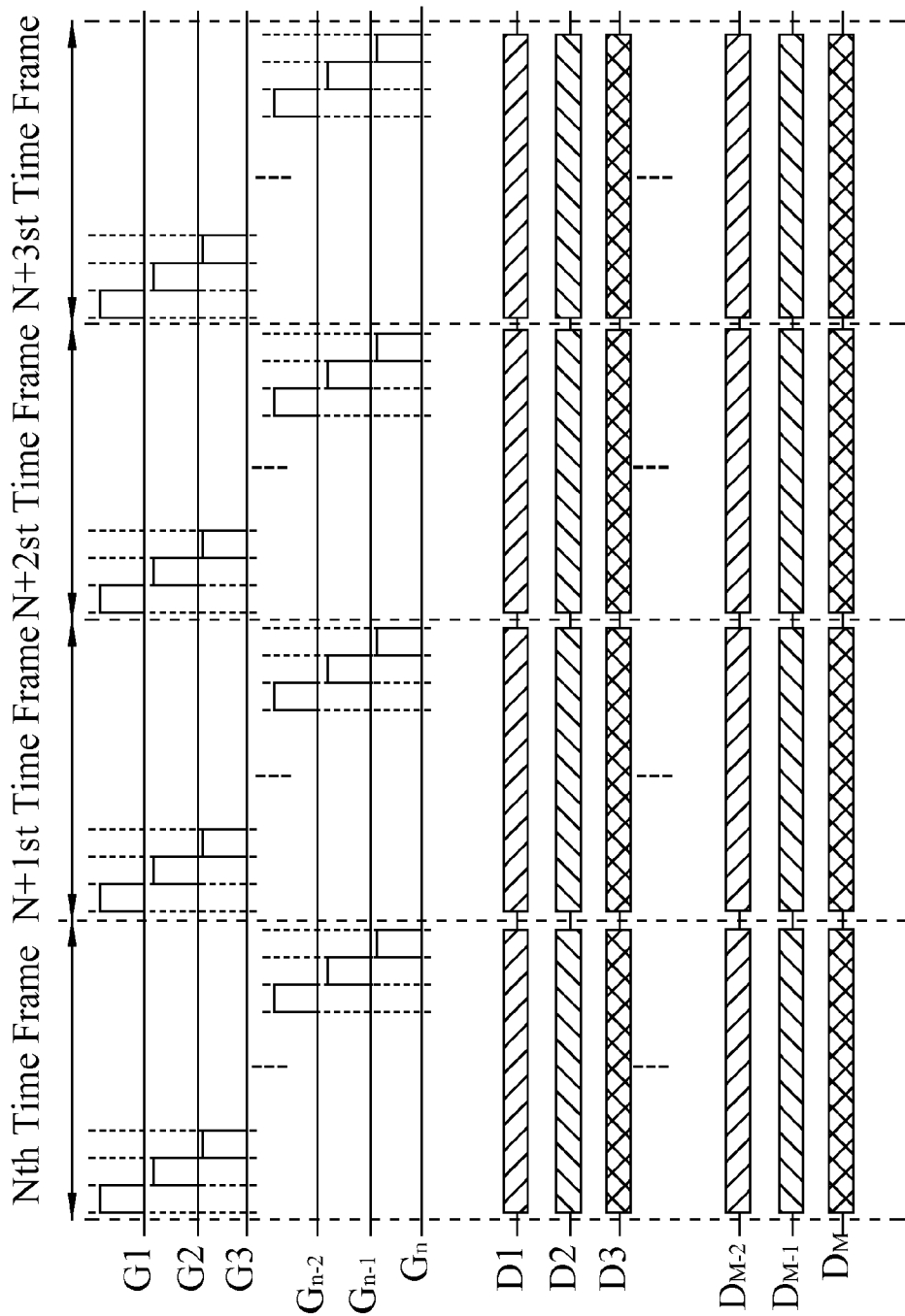
FIG. 11 is a timing diagram for the first embodiment of the liquid crystal display panel according to the present invention.

FIG. 11 illustrates a timing diagram for the first embodiment of the liquid crystal display panel according to the present invention. In conjunction with FIG. 10, during the Nth time frame, a first control signal is outputted to a plurality of first scan lines G1-Gn through a first gate driving circuit 102 so as to sequentially initiate each thin film transistor disposed at the intercross of a first data line 1031 and a first scan line 1021. Wherein the first control signal is composed of n pulse signals. At this moment, the data driving circuit 103 outputs the display data to a plurality of first data lines D1-Dm so as to update the screen displayed on the liquid crystal panel. Following this, during the N+1 time frame, the first gate driving circuit 102 sequentially outputs n pulse signals, and outputs to the plurality of first scan lines G1-Gn to sequentially initiate each thin film transistor disposed at the intercross of the first data line 1031 and the first scan line 1021. At this moment, the data driving circuit 103 outputs the display data to the plurality of first data lines D1-Dm so as to update the screen displayed on the liquid crystal panel. Next, during the N+2 time frame, the first gate driving circuit 102 sequentially outputs n pulse signals once more, and outputs to the plurality of first scan lines G1-Gn to sequentially initiate each thin film transistor disposed at the intercross of the first data line 1031 and the first scan line 1021. At this moment, the data driving circuit 103 outputs the display data to the plurality of first data lines D1-Dm so as to update again the screen displayed on the liquid crystal panel. In continuation of this, during the N+3 time frame, the first gate driving circuit 102 sequentially outputs further n pulse signals again, and outputs to the plurality of first scan lines G1-Gn to sequentially initiate each thin film transistor disposed at the intercross of the first data line 1031 and the first scan line 1021. At this moment, the data driving circuit 103 outputs the display data to the plurality of first data lines D1-Dm so as to update yet once more the screen displayed on the liquid crystal panel.

Figure 12A:
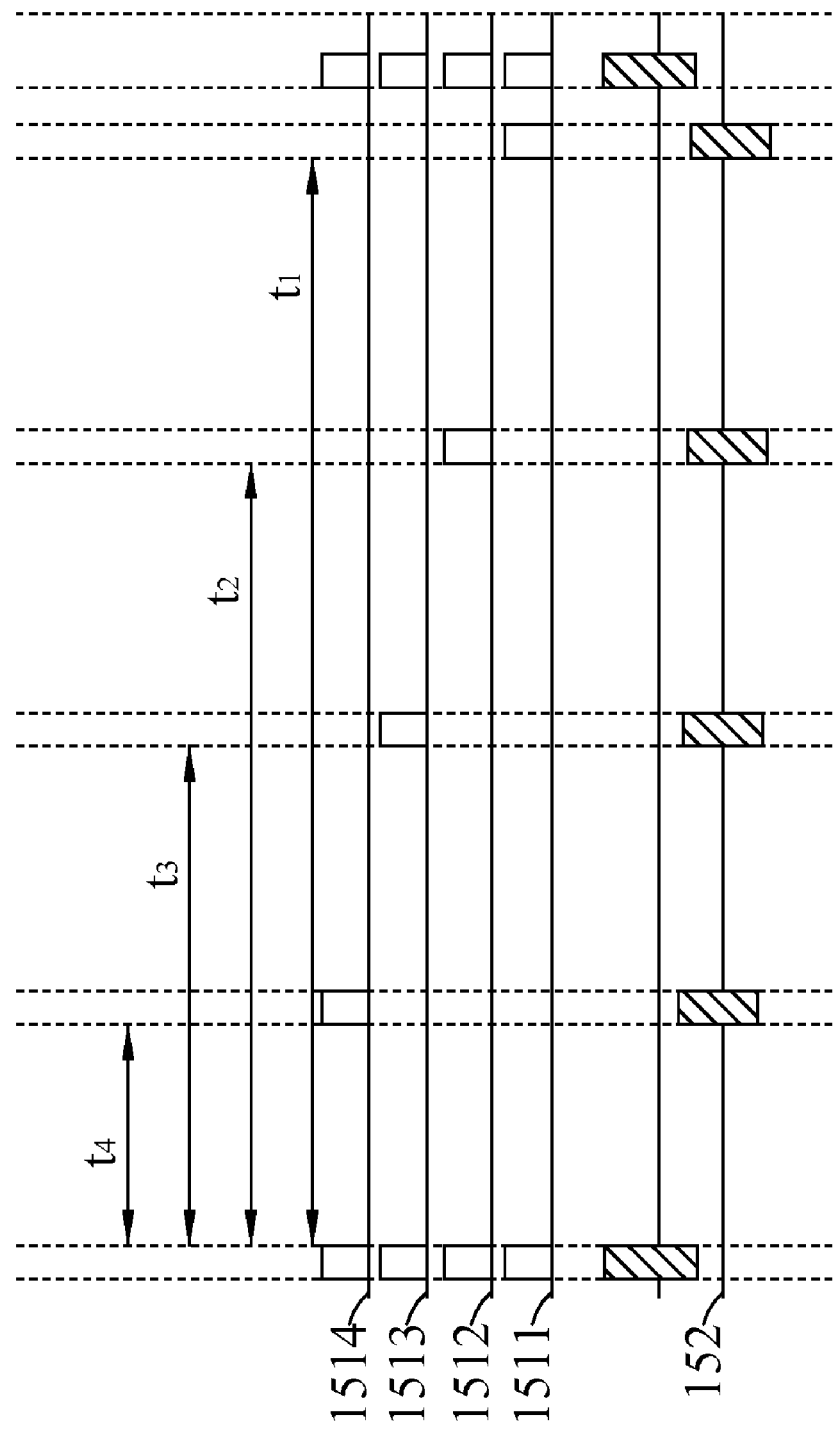
FIG. 12a is a timing diagram for the second embodiment of the liquid crystal display panel according to the present invention.

FIG. 12a illustrates for a timing diagram for the second embodiment of the liquid crystal display panel according to the present invention. In conjunction with FIGS. 1 and 10, upon provision of the unitary reference data, the photo detection driving circuit 104 outputs at least one second control signal to the built-in photo detecting module 15, 106. The second control signal comprises a data write enable pulse and a data read enable pulse. When multiple transistors 1531 receive the data write enable pulse, at least one storage capacitor 1532 of each photo detecting unit 153 is charged based on the reference signal, and each second thin film transistor 1531 is initiated through at least one second scan line 151, 1021. The reference data is written into the storage capacitor 1532 at the same time.

Through the irradiation time of external ambient light $t_1$-$t_4$, the storage capacitor 1532 is discharged via the photo sensing component 1533. When the thin film transistor T1-T4 receives the data read enable pulse, the photo detection driving circuit 104 read the voltage value in the storage capacitor 1532 of each photo detecting unit 153, and a multi-bit digital signal based on the voltage value is generated. After the exposure time of $t_1$, the second scan line 1511 initiates the thin film transistor T4, and the voltage value on the storage capacitor 1532 connected therewith is read out through the second data line 152. After the exposure time of $t_2$, the second scan line 1512 initiates the thin film transistor T3, and the voltage value on the storage capacitor 1532 connected therewith is read out through the second data line 152. After the exposure time of $t_3$, the second scan line 1513 initiates the thin film transistor T2, and the voltage value on the storage capacitor 1532 connected therewith is read out through the second data line 152. After the exposure time of $t_4$, the second scan line 1514 initiates the thin film transistor T1, and the voltage value on the storage capacitor 1532 connected therewith is read out through the second data line 152, all of which indicating the asynchronous state of the data read enable pulses.

Figure 12B:
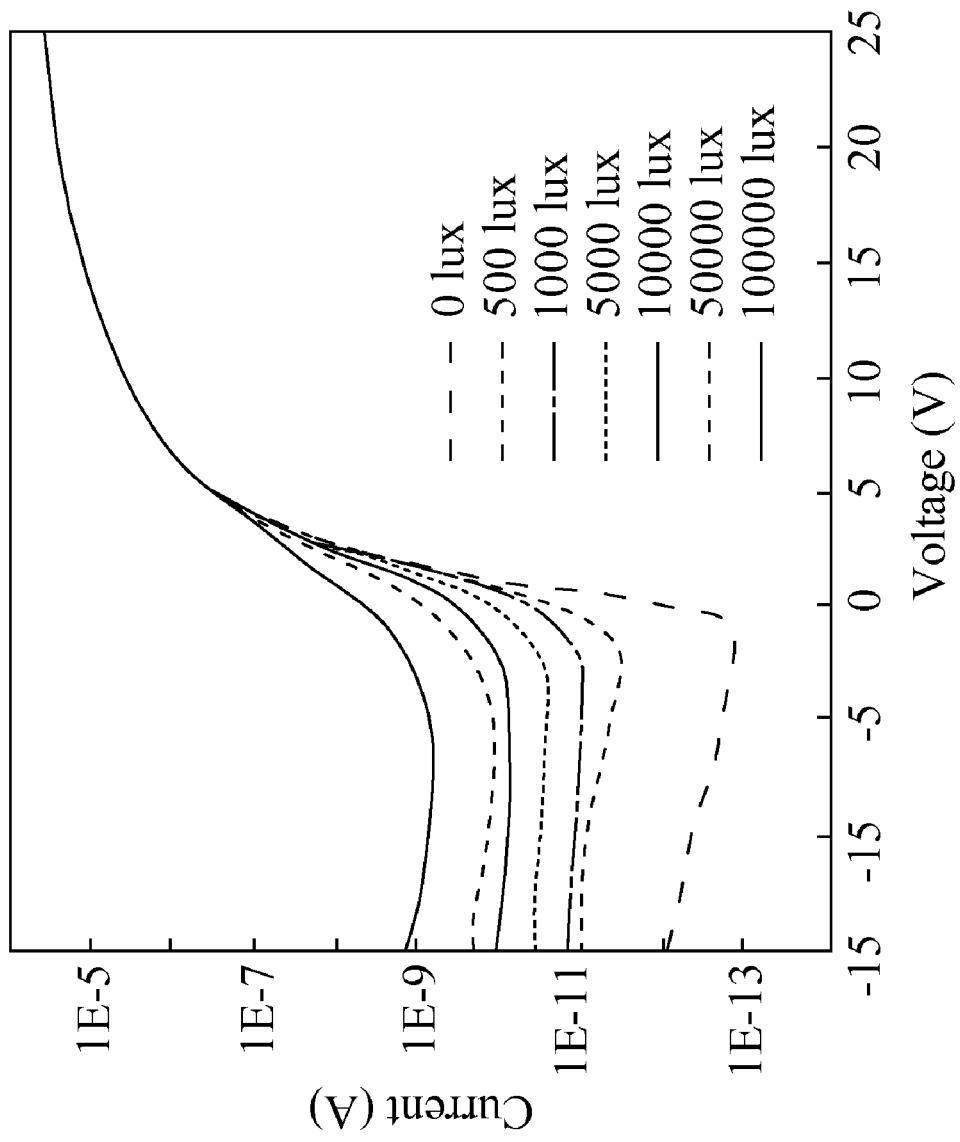
FIG. 12b is a diagram for electrical signals of the ambient light irradiation.

FIG. 12b illustrates for a diagram for electrical signals of the ambient light irradiation on photo transistor. Under irradiation of external ambient light, the photo transistor may convert light signal to electric signal. Therefore, by controlling the photo transistor in a fixed bias voltage, different intensity of ambient light may correspond to different photo-current value. Taking the present embodiment for example, the light intensity is respectively 0 lux, 500 lux, 1000 lux, 5000 lux, 10000 lux, 50000 lux, 100000 lux, and a stronger light intensity enables a higher photo-current value.

Reference may be made to the following Table 1, wherein a table of dimming level relationship for the logic design embodiment of the computation circuit 105 is shown. The photo detection driving circuit 104 may therefore generate a multi-bit digital signal based on the voltage value. The computation circuit 105 receives and computes the multi-bit digital signal, and the level of light dimming may be determined by the logic operating in accordance with high/low order. Taking the present embodiment for example, a different range of light intensity may be determined by means of setting the environmental conditions as Pitch Black, Very Dark, Dark Indoors, Dim Indoors, Normal Indoors, Bright Indoors, Dim Outdoors, Cloudy Outdoors and Direct Sunlight and the like, and use them as the level of light dimming based on the average of the light intensity range. For example, (H, H, H, H) indicates level 0 dimming, (L, H, H, H) indicates level 1 dimming, (L, L, H, H) indicates level 2 dimming, (L, L, L, H)

indicates level 3 dimming and (L, L, L, L) for level 4 dimming. When the backlight module 107 is coupled, the backlight module 107 may be controlled in accordance with the obtained intensity of light. For example, when light intensity of 2000 lux is detected, the environmental condition thereof corresponds to the table one for Bright Indoors, and the computation circuit may determine it as the level 2 dimming. When the computation circuit 105 is coupled to the backlight module 107, it is thus possible to adjust the backlight of the backlight module 107 based on the acquired computation rules.

TABLE 1

Table of Dimming Level Relationship for Logic Design Embodiment of Computation Circuit

| Environmental Condition | From (lux) | To (lux) | Average (lux) | Computation Rules | Dimming Level |
|---|---|---|---|---|---|
| Pitch Black | 0 | 10 | 5 | (H, H, H, H) | 0 |
| Very Dark | 10 | 50 | 30 | (H, H, H, H) | 0 |
| Dark Indoors | 50 | 200 | 125 | (H, H, H, H) | 0 |
| Dim Indoors | 200 | 400 | 300 | (L, H, H, H) | 1 |
| Normal Indoors | 400 | 1000 | 700 | (L, H, H, H) | 1 |
| Bright Indoors | 1000 | 5000 | 3000 | (L, L, H, H) | 2 |
| Dim Outdoors | 5000 | 10000 | 7500 | (L, L, L, H) | 3 |
| Cloudy Outdoors | 10000 | 30000 | 20000 | (L, L, L, H) | 3 |
| Direct Sunlight | 30000 | 100000 | 65000 | (L, L, L, L) | 4 |

Figure 13:
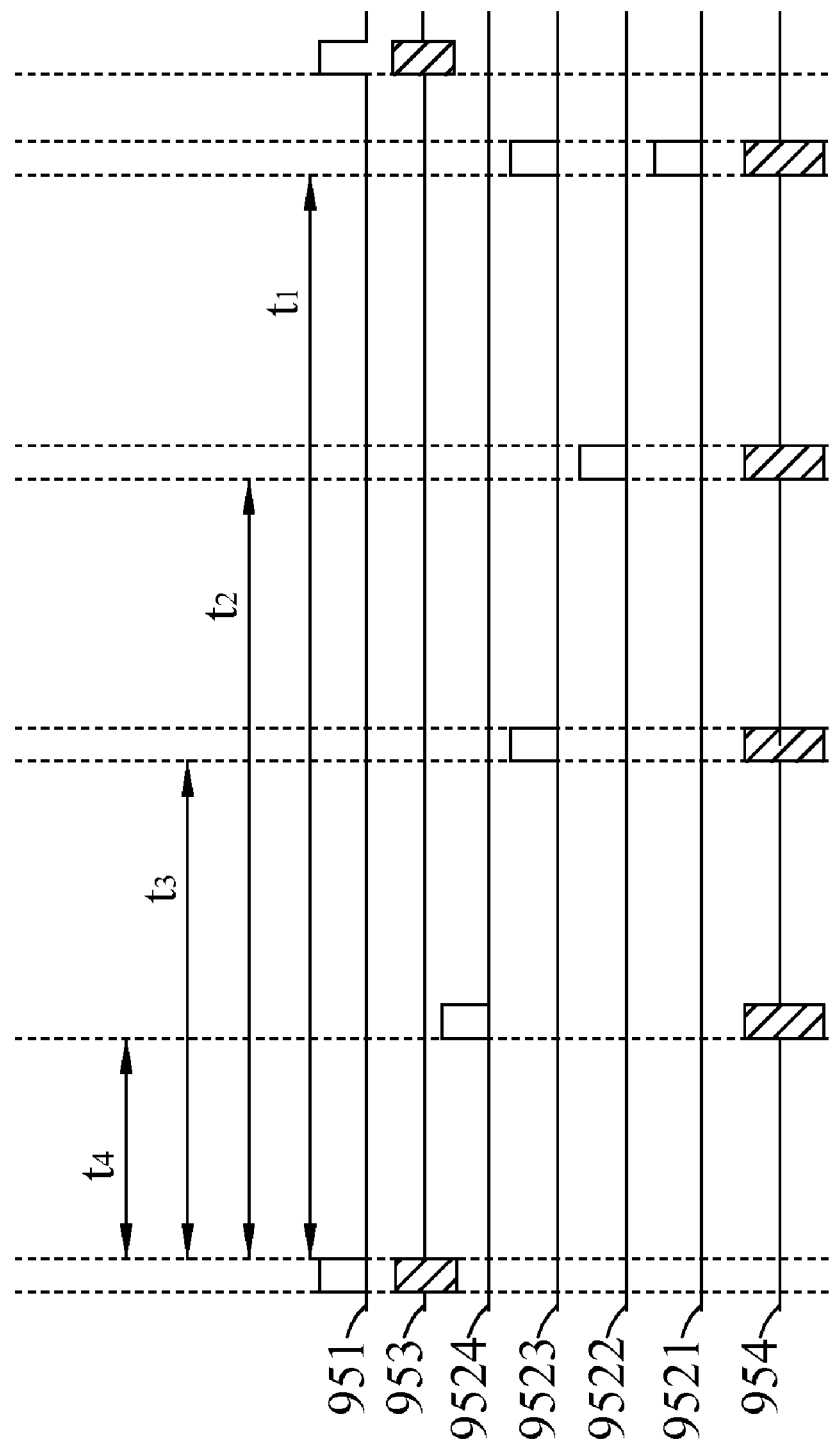
FIG. 13 is a timing diagram for the third embodiment of the liquid crystal display panel according to the present invention.

FIG. 13 illustrates for a timing diagram for the third embodiment of the liquid crystal display panel according to the present invention. In conjunction with FIGS. 9 and 10, upon provision of unitary reference data, the photo detection driving circuit 104 outputs at least one second control signal to the built-in photo detecting module 106, 95. The second control signal comprises a data write enable pulse and a data read enable pulse. When multiple transistors T1-T4 receive the data write enable pulse, the storage capacitor 9553 of each photo detecting unit 955 is charged based on the reference signal, and each second thin film transistor 9551 is initiated through the second scan line 951, and the reference data is written into the storage capacitor 9553 at the same time.

Through the irradiation time of external ambient light $t_1$-$t_4$, the storage capacitor 9553 is discharged via the photo sensing component 9554. When the thin film transistor T1-T4 receives the data read enable pulse, the photo detection driving circuit 104 read the voltage value in the storage capacitor 9553 of each photo detecting unit 955, and generates a multi-bit digital signal based on the voltage value. After the exposure time of $t_1$, the third scan line 9524 initiates the thin film transistor T8, and the voltage value on the storage capacitor 9553 connected therewith is read out through the third data line 954. After the exposure time of $t_2$, the third scan line 9523 initiates the thin film transistor T7, and the voltage value on the storage capacitor 9553 connected therewith is read out through the second data line 954. After the exposure time of $t_3$, the third scan line 9522 initiates the thin film transistor T6, and the voltage value on the storage capacitor 9553 connected therewith is read out through the third data line 954. After the exposure time of $t_4$, the third scan line 9521 initiates the thin film transistor T5, and the voltage value on the storage capacitor 9553 connected therewith is read out through the third data line 954, all of which also indicating the asynchronous state of the data read enable pulse.

The photo detection driving circuit 104 may therefore generate a multi-bit digital signal based on the voltage value. The computation circuit 105 receives and computes the multi-bit digital signal, and the level of light dimming may be determined by the logic operating in accordance with high/low order. For example, (H, H, H, H) indicates level 0 dimming, (L, H, H, H) indicates level 1 dimming, (L, L, H, H) indicates level 2 dimming, (L, L, L, H) indicates level 3 dimming and (L, L, L, L) for level 4 dimming. When the backlight module 107 is coupled, the backlight module 107 may be controlled in accordance with the obtained intensity of light.

Figure 14:
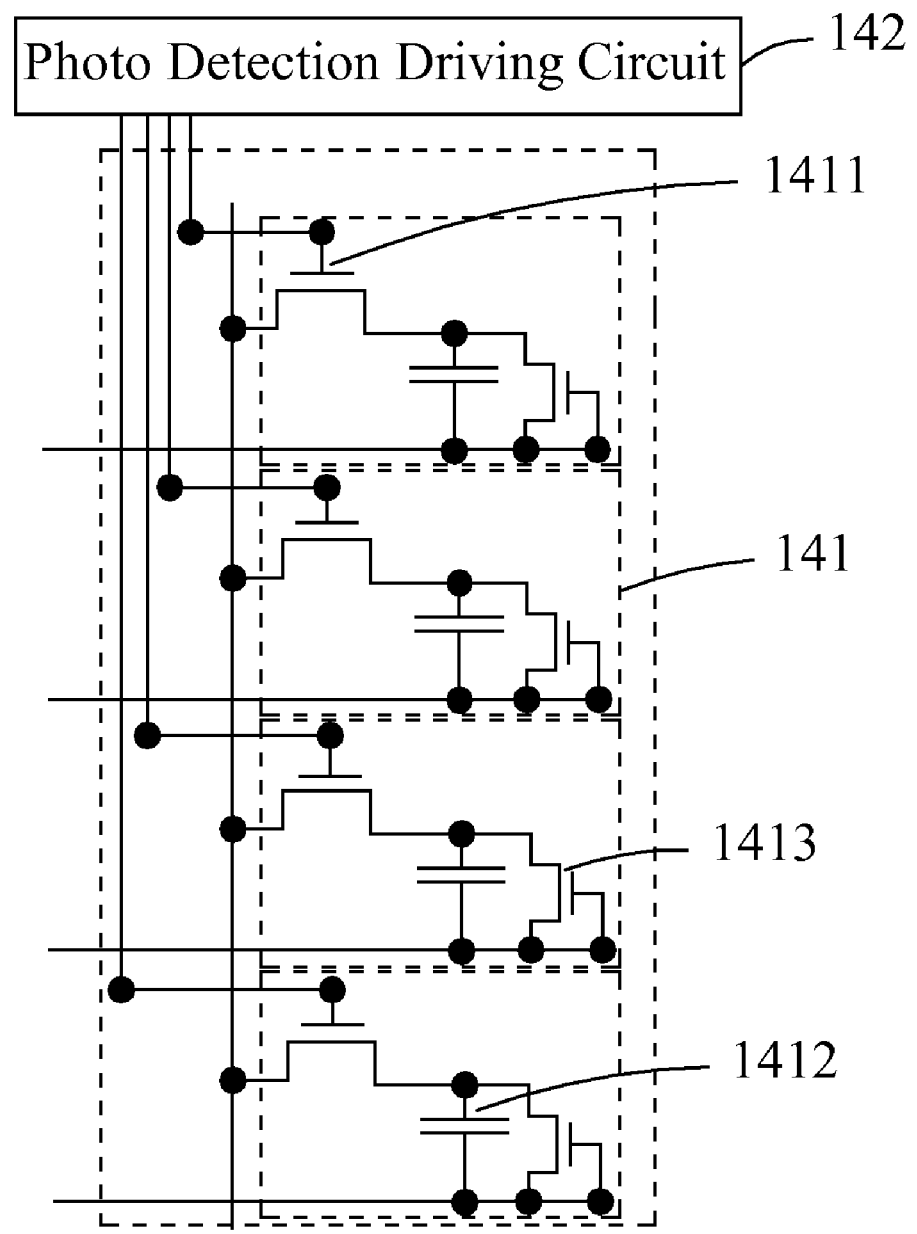
FIG. 14 is a diagram of a photo detecting device according to the present invention.

FIG. 14 illustrates a diagram for a photo detecting device according to the present invention. The illustrated photo detecting device may be used to detect light and outputs a multi-bit digital signal corresponding to the intensity of the light, comprising a plurality of photo detecting units 141 and a photo detection driving circuit 142. Each photo detecting unit 141 comprises a transistor 1411, at least one storage capacitor 1412 and at least one light sensitive element 1413, with the transistor 1411, the storage capacitor 1412 and the light sensitive element 1412 being electrically connected. The photo detection driving circuit 142 outputs at least one control signal and a data read enable pulse. When the plurality of transistors 1411 receive the data write enable pulse, the at least one storage capacitor 1412 of each photo detecting unit 141 is charged based on the reference signal. When the plurality of transistors 1411 receive the data read enable pulse, the photo detection driving circuit 142 reads the voltage value of the at least one storage capacitor 1412 of each photo detecting unit 141, and generates a multi-bit digital signal in accordance with multiple voltage values. When there are multiple control signals, it indicates the asynchronous state of the plurality of data read enable pulses.

Herein, numbers of the storage capacitors 1412 in the plurality of photo detecting units 141 may be different, and the same effect may be also achieved by configuring the storage capacitors 1412 in the plurality of photo detecting units 141 with different capacitance values. Numbers of the light sensitive elements 1413 in the plurality of photo detecting units 141 may be different, and the same effect may be also achieved by configuring the light sensitive element 1413 in the plurality of photo detecting units 141 with different photo sensing area. Herein, the light sensitive element 1413 may be a photo transistor or a photo diode.

Figure 15:
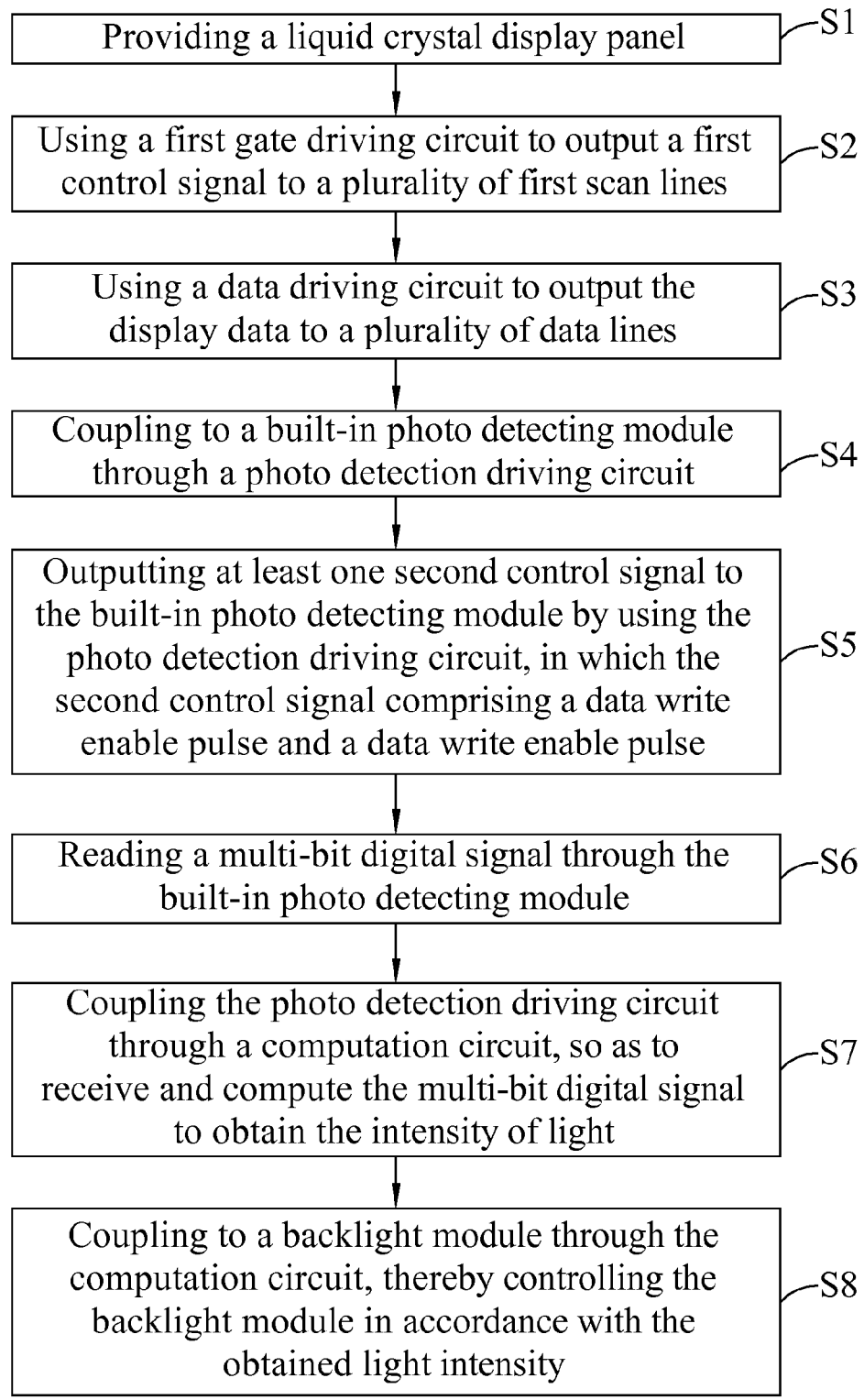
FIG. 15 is a flowchart for a first embodiment of the light intensity adjustment method according to the present invention.

FIG. 15 illustrates a flowchart for a first embodiment of the light intensity adjustment method according to the present invention. In this embodiment, the illustrated light intensity adjustment method is applied in the liquid crystal display device and comprises the following steps. In STEP 51, a liquid crystal display panel is provided, and in STEP S2 a first gate driving circuit is used to output a first control signal to a plurality of first scan lines. In STEP S3, a data driving circuit is used to output the display data to a plurality of data lines. Then, a photo detection driving circuit is coupled to a built-in photo detecting module in STEP S4. In STEP S5, at least one second control signal is outputted to the built-in photo detecting module by using the photo detection driving circuit, in which the second control signal comprises a data write enable pulse and a data write enable pulse, and when there are multiple second control signals, the plurality of data read enable pulses are asynchronous. In STEP S6, a multi-bit digital signal is read through the built-in photo detecting module. In STEP S7, a computation circuit is coupled to so as to receive and compute the multi-bit digital signal to obtain the intensity of light. Herein it further comprises a STEP S8, the computation circuit is coupled to a backlight module, thereby controlling the backlight module in accordance with the obtained light intensity.

Figure 16:
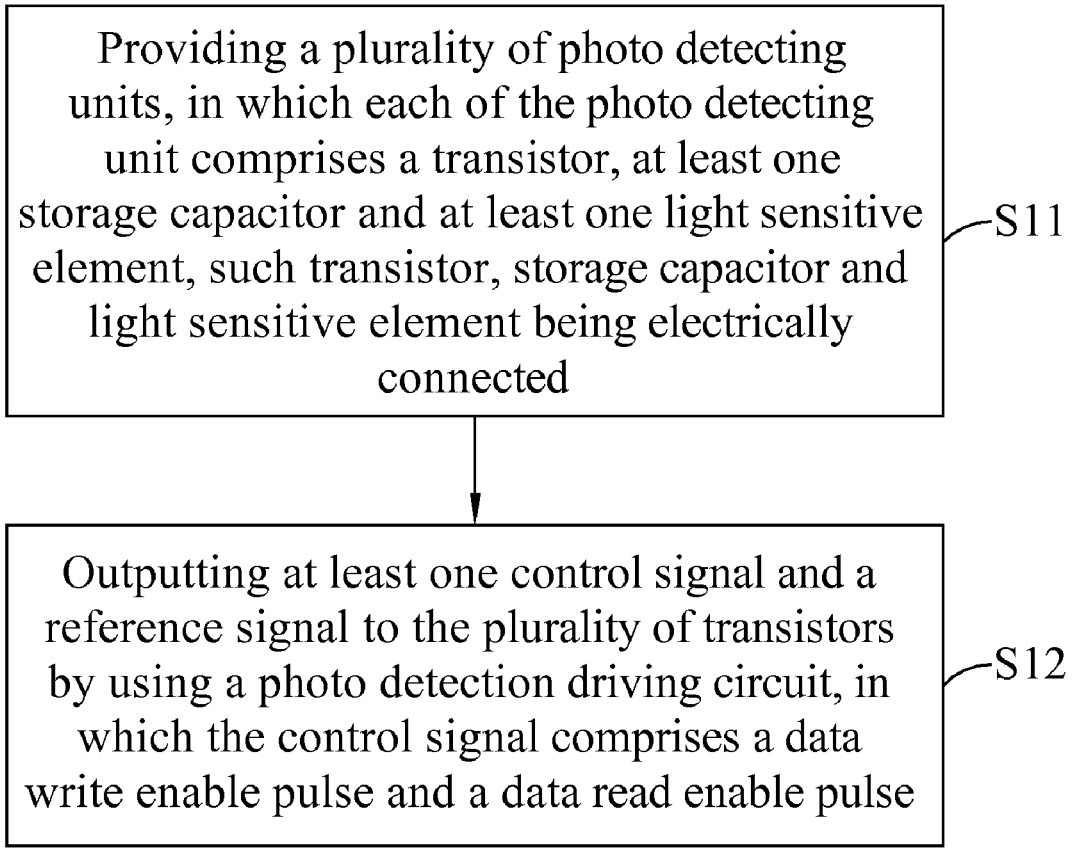
FIG. 16 is a flowchart for a second embodiment of the light intensity adjustment method according to the present invention.

FIG. 16 illustrates for a flowchart for a second embodiment of the light intensity adjustment method according to the present invention. The present method may be applied to a photo detecting device, and the photo detecting device is capable of detecting light and outputting a multi-bit digital signal corresponding to the intensity of the light. The method comprises the following steps. In STEP S11, a plurality of photo detecting units is provided. Each photo detecting unit comprises a transistor, at least one storage capacitor and at least one light sensitive element and the transistor, storage capacitor and light sensitive element are electrically connected. In STEP S12, at least one control signal and a reference signal are outputted to the plurality of transistors by using a photo detection driving circuit. The control signal comprises a data write enable pulse and a data read enable pulse. When there are multiple control signals, it indicates the plurality of data read enable pluses are asynchronous.

When the plurality of transistors receive the data write enable pulse, the at least one storage capacitor of each photo detecting unit is charged based on the reference signal. When the plurality of transistors receive the data read enable pulse, the photo detection driving circuit reads the voltage value of the at least one storage capacitor in each photo detecting unit, and generates a multi-bit digital signal based on the multiple voltage values.

Preferably, the numbers of the storage capacitors in the plurality of photo detecting units may be different, and the same effect may be also achieved by configuring the storage capacitors in the plurality of photo detecting units with different capacitance values. The numbers of the light sensitive element in the plurality of photo detecting units may be different, and the same effect may be also achieved by configuring the light sensitive element in the plurality of photo detecting units with different photo sensing area. Preferably, the light sensitive element may be a photo transistor or a photo diode.

The illustrated photo detecting device architecture is by no means limited to the liquid crystal display panel, liquid crystal display device; all display panels and display devices comprising active matrix, such as display panel and display device comprising Active Matrix Organic Light Emitting Diode (AMOLED) and Active Matrix Electronic Paper Display (AMEPD), are applicable for the illustrated photo detecting device architecture.

The aforementioned descriptions are simply exemplary, rather than being limiting. All effectively equivalent changes or modifications made thereto without departing from the spirit and scope of the present invention are deemed to be included in the claims set forth hereunder.

What is claimed is:

1. A liquid crystal display panel, comprising:
a plurality of first scan lines;
a plurality of first data lines;
a plurality of first thin film transistors respectively disposed at intercrosses of the plurality of first scan lines and the plurality of first data lines, and each of the first thin film transistors being connected to the first data line and the first scan line;
a plurality of liquid crystal pixel units each being driven respectively by the first thin film transistor;
a built-in photo detecting module detecting light and outputting a multi-bit digital signal corresponding to intensity of the light, wherein the built-in photo detecting module comprising: at least one second scan line, at least one second data line and a plurality of photo detecting units, wherein each of the photo detecting units comprises a second thin film transistor, at least one storage capacitor and at least one photo transistor and the second thin film transistor, the storage capacitor and the photo transistor are electrically connected, and wherein each of the second thin film transistors is connected to the second scan line and the second data line; and
a color filter disposed upon the plurality of the first thin film transistors and the plurality of photo detecting units, wherein the color filter is provided with multiple transparent apertures of different sizes, and locations of the multiple transparent apertures are respectively corresponded to the plurality of photo detecting units.

2. The liquid crystal display panel according to claim 1, wherein, when there are multiple second scan lines, the plurality of second thin film transistors are respectively connected to each of the second scan lines and the second data line.

3. The liquid crystal display panel according to claim 1, wherein, when there are multiple second data lines, each of the plurality of second thin film transistors is respectively connected to the second scan line and each of the second data lines.

4. The liquid crystal display panel according to claim 1, wherein the built-in photo detecting module comprising:
a second scan line;
a plurality of third scan lines;
a second data line;
a third data line; and
a plurality of photo detecting units each comprising a second thin film transistor, a third thin film transistor, at least one storage capacitor and at least one light sensitive element, and the second thin film transistor, the third thin film transistor, the storage capacitor and the light sensitive element being electrically connected;
wherein each of the second thin film transistors is respectively connected to the second scan line and the second data line, and each of the third thin film transistor is respectively connected to each of the third scan lines and the third data line.

5. The liquid crystal display panel according to claim 1, wherein the storage capacitors in the plurality of photo detecting units are provided with different capacitance values.

6. The liquid crystal display panel according to claim 1, wherein numbers of the storage capacitors in the plurality of photo detecting units are not the same.

7. The liquid crystal display panel according to claim 1, wherein the light sensitive elements of the plurality of photo detecting units are provided with different photo sensing areas.

8. The liquid crystal display panel according to claim 1, wherein the numbers of the light sensitive elements of the plurality of photo detecting units are not the same.

9. A liquid crystal display device, comprising:
a liquid crystal display panel according to claim 1;
a first gate driving circuit outputting a first control signal to a plurality of first scan lines;
a data driving circuit outputting display data to the plurality of data lines;
a photo detection driving circuit being coupled to the built-in photo detecting module, outputting at least one second control signal to the built-in photo detecting module and reading a multi-bit digital signal from the built-in photo detecting module; and
a computation circuit being coupled to the photo detection driving circuit, and receiving the multi-bit digital signal, and computing the intensity of the light based on the multi-bit digital signal.

10. The liquid crystal display device according to claim 9, wherein the second control signal comprises a data write enable pulse and a data read enable pulse.

11. The liquid crystal display device according to claim 10, wherein, when there are multiple second control signals, the plurality of data read enable pulses are asynchronous.

12. The liquid crystal display device according to claim 9, further comprising a backlight module, wherein the computation circuit is coupled to the backlight module and controls the backlight module based on the computed intensity of light.

13. A light intensity adjustment method for a liquid crystal display device, comprising the following steps:
 providing the liquid crystal display panel according to claim 1;
 using a first gate driving circuit to output a first control signal to a plurality of first scan lines;
 using a data driving circuit to output display data to the plurality of first data lines;
 coupling a photo detection driving circuit to the built-in photo detecting module;
 using the photo detection driving circuit to output at least one second control signal to the built-in photo detecting module;
 reading a multi-bit digital signal by the built-in photo detecting module; and
 coupling the computation circuit to the photo detection driving circuit and using the computation circuit to receive the multi-bit digital signal and compute the intensity of light based on the multi-bit digital signal.

14. A photo detecting device capable of detecting light and outputting a multi-bit digital signal corresponding to intensity of light, comprising:
 a plurality of photo detecting units, each comprising a transistor, at least one storage capacitor and at least one photo transistor, and the transistor, the storage capacitor and the photo transistor being electrically connected;
 a color filter disposed upon the plurality of photo detecting units, wherein the color filter is provided with multiple transparent apertures of different sizes, and locations of the multiple transparent apertures are respectively corresponded to the plurality of photo detecting units; and
 a photo detection driving circuit, outputting at least one control signal and a reference signal to a plurality of the transistors, the control signal comprising a data write enable pulse and a data read enable pulse;
 wherein, when the plurality of transistors receive the data write enable pulse, the at least one storage capacitor for each of the photo detecting unit is charged by the reference signal;
 wherein, when the plurality of transistors receive the data read enable pulse, the photo detection driving circuit reads a voltage value of the at least one storage capacitor for each of the photo detecting unit, and generates a multi-bit digital signal based on the multiple voltage values.

15. The photo detecting device according to claim 14, wherein the storage capacitors in the plurality of photo detecting units have different capacitance values, or numbers of the storage capacitors in the plurality of photo detecting units are not the same.

16. The photo detecting device according to claim 14, wherein the light sensitive element of the plurality of photo detecting units are provided with different photo sensing areas.

17. The photo detecting device according to claim 14, wherein numbers of light sensitive element in the plurality of photo detecting units are not the same.

* * * * *